No. 775,138. PATENTED NOV. 15, 1904.
R. W. GRUNSKE.
TRUCK.
APPLICATION FILED AUG. 31, 1903. RENEWED JULY 18, 1904.
NO MODEL. 2 SHEETS—SHEET 1.
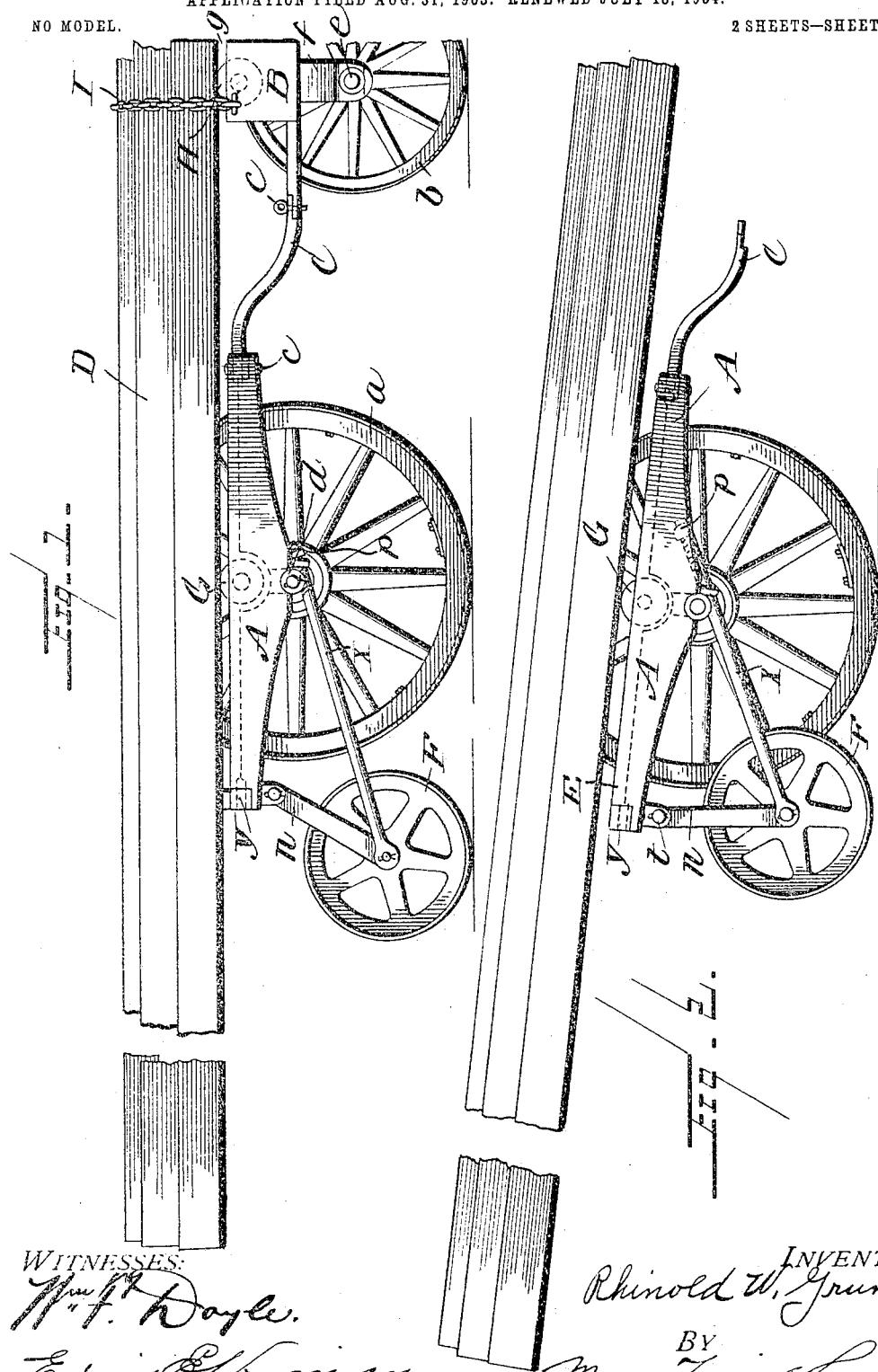
WITNESSES:
INVENTOR
Rhinold W. Grunske
By
Attorneys No. 775,138. PATENTED NOV. 15, 1904.
R. W. GRUNSKE.
TRUCK.
APPLICATION FILED AUG. 31, 1903. RENEWED JULY 18, 1904.
NO MODEL. 2 SHEETS—SHEET 2.
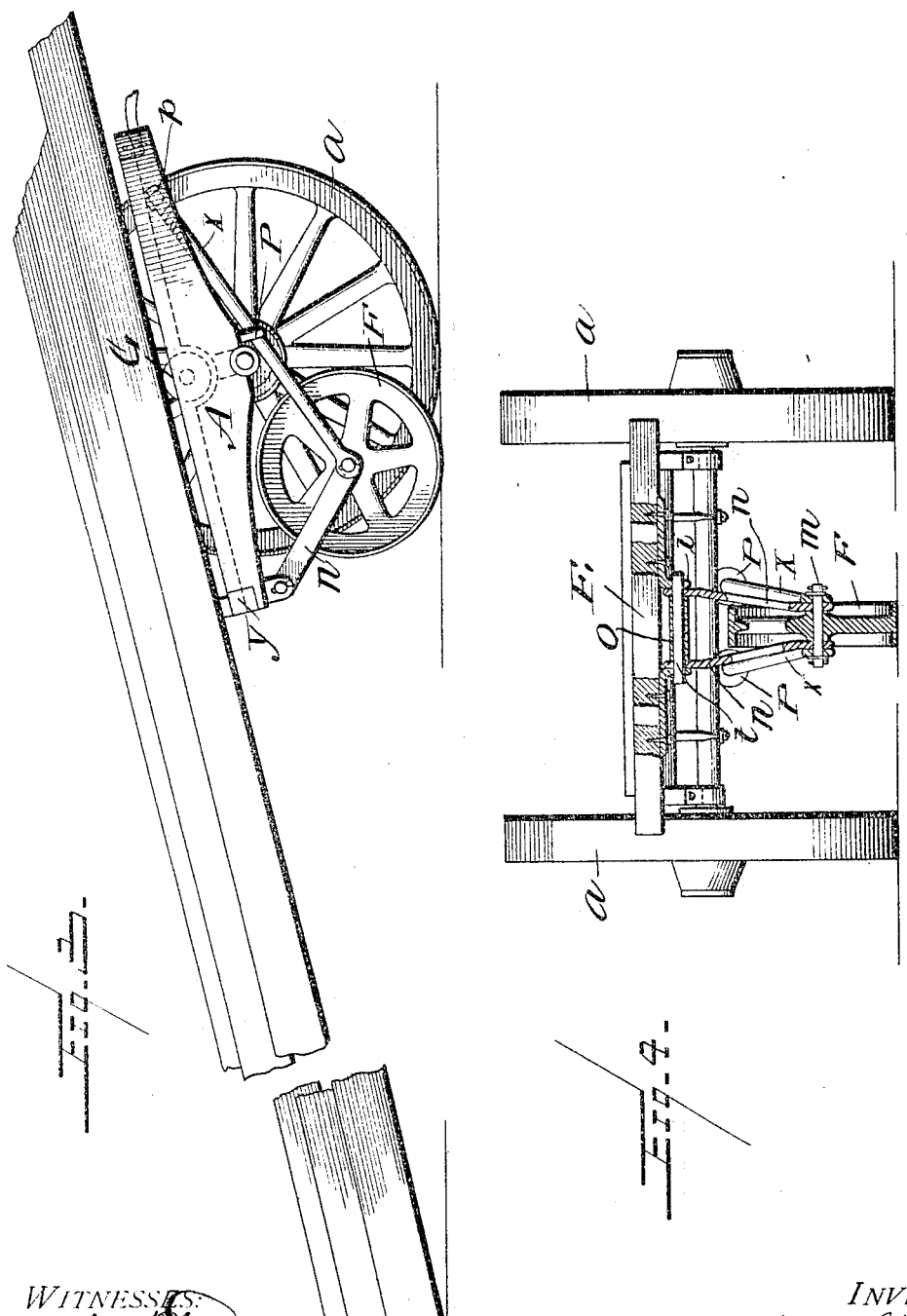
WITNESSES:
INVENTOR
Rhinold W. Grunske
By
Attorneys No. 775,138. Patented November 15, 1904.

UNITED STATES PATENT OFFICE.

RHINOLD W. GRUNSKE, OF OSHKOSH, WISCONSIN.

TRUCK.

SPECIFICATION forming part of Letters Patent No. 775,138, dated November 15, 1904.

Application filed August 31, 1903. Renewed July 18, 1904. Serial No. 217,135. (No model.)

*To all whom it may concern:*

Be it known that I, RHINOLD W. GRUNSKE, a citizen of the United States, residing at Oshkosh, in the county of Winnebago and State of Wisconsin, have invented new and useful Improvements in Trucks, of which the following is a specification.

My invention relates to improvements in trucks, and more particularly to lumber-trucks, the objects being to dump the lumber from either end of the truck automatically, to save time in unloading, and to facilitate the operation of dumping.

With these and other objects in view my invention consists in certain novel features of construction and combination of parts, as will be hereinafter more fully described, and pointed out in the claims.

In the drawings, Figure 1 is a side view of the invention. Fig. 2 is a side view of the rear truck, showing the same in the act of dumping. Fig. 3 is a side view of the truck, the same in the act of moving forwardly from under the load. Fig. 4 is an end view of the truck, part of the same shown in section.

Similar letters refer to similar parts in each view.

A represents the dumping-truck, and B a front supporting-truck connected therewith by a detachable reach C, which is secured to each truck by means of removable pins C C. The front truck B supports the front end of the load of lumber D, and consists of two wheels $b\ b$, axle $e$, bolster $f$, and floor $g$. A roller H is supported by the truck B, and a binding-chain I is attached to the bolster to use in binding the load.

The dumping-truck A consists of the two wheels $a\ a$, the axle $d$, body or floor frame E, and an auxiliary wheel F, hinged underneath one end of the body E. A roller G is also supported by the body. The wheel F revolves upon the bolt $m$, which passes through eyes in the hangers $n\ n$, depending from the rod $t$, which passes through eyes in the opposite ends of the hangers and through the ears or brackets $i\ i$, attached to the frame of the floor. O represents a tubular spreader surrounding the rod $t$ between the upper ends of the hangers. The bolt $m$ also passes through eyes in the lower ends of the rods $x\ x$, which extend diagonally upward and pass loosely through the eyes P P, projecting beneath the axle, the nuts $p\ p$ being secured to the upper ends.

In the operation of my invention the load of lumber is first secured to the trucks, as shown in Fig. 1, resting upon the rollers G H. It is hauled to the desired locality for dumping, the driver usually sitting on the front ends of the lumber. When desiring to dump the load, he removes the binding-chain I and either of the pins $c\ c$, then drives the front truck from beneath the lumber, the roller H operating for this purpose. The lumber is so balanced that the rear end will drop down to the position shown in Fig. 3 as soon as the front end is released, and the weight of the lumber will roll the dumping-truck forward from beneath the load, the roller G operating for this purpose. The truck is then ready for recoupling to receive another load.

Coupling-recesses $y$ are provided at both ends of the rear or dumping truck, so that either end may be coupled to the front truck. This feature saves time in operation, as it is not necessary to turn the rear truck around in order to attach to the front truck. In the dumping operation the auxiliary wheel F either drops by gravitation to the position shown in Fig. 2 or is forced by the weight of the load to the position shown in Fig. 3, the rods $x\ x$ sliding in the eyes P P. When at the position shown in Fig. 1, the nuts $p\ p$ operate as stops against the eyes P P to hold the wheel at the proper position for supporting the load and retaining the truck-body upon a level, and for this purpose may be properly regulated by means of screw-threads cut in the upper bolt ends, so that the nuts are rendered adjustable.

As heretofore stated, it is obvious that the primary truck may be assembled with the front truck by means of the detachable reach, and it is immaterial which end of the said truck is placed in a position adjacent to the said front truck. The reach C may be attached to either end of the truck at Y. If it is desired to remove the truck from under the load at the forward end of the same, it will be necessary to pivot the load, as shown in Fig. 2, so as to permit of the auxiliary wheel F swinging under the truck, as shown in Fig. 3, and upon the rear part of the load coming in contact with the ground the truck will move forward from under the same. If it is immaterial from under which end of the load the truck is to be removed, the detachable forward truck may be taken from under said load and the primary truck will move from under the same at the rear portion thereof, if it is in position shown in Fig. 1.

It is obvious that the rear or dumping truck may be used without the front truck where short loads are carried or where a hand-truck is desired.

Having thus described my invention, what I claim to have invented, and desire to secure by Letters Patent, is—

1. In a device of the character described, the combination of a removable front truck, of a rear axle detachably secured to said front truck, said rear truck comprising a platform, an axle secured thereto, a pair of wheels journaled upon said axle, a pair of hangers secured to said truck, an auxiliary wheel carried by said hangers, a pair of rods secured to said hangers and slidably mounted within eyes secured to the body portion of said truck, and transverse rollers journaled upon said body portion.

2. In a device of the character described, the combination of a front truck provided with a reach, a rear truck comprising a body portion secured to an axle, a pair of wheels journaled upon said axle, a reach detachably secured to said body portion and detachably secured to said reach secured to the front truck, brackets secured to said body portion of the rear truck, a pair of hangers detachably secured to said brackets, a wheel journaled between said hangers, a pair of rods secured to said hangers and slidably mounted within means secured to the body portion of the truck and provided with detachable means for retaining the said rods in position within said means, and a pair of rollers journaled upon the body portion of said truck.

3. A truck comprising a body portion secured to an axle carrying a plurality of wheels, said body portion provided with rollers secured to the same in a transverse position, brackets secured to said body portion, a horizontal rod connecting said brackets, a tubular spreader rotatably secured upon said rod, a pair of hangers carried by said rod and brackets a bolt secured to said hangers, a wheel journaled upon said bolt, rods detachably secured to said bolt and slidably mounted within eyes secured to the body portion of the truck, and means secured to said rod for limiting the movement thereof.

4. A truck comprising a body portion mounted upon an axle provided with two wheels, parallel auxiliary rollers carried by the body portion and partly extending beyond the horizontal plane of the floor of said body portion, an auxiliary wheel hinged beneath one end of said body portion and adapted to swing upon eyebolts passing through eyes beneath the body, 5. A truck comprising a body mounted upon an axle provided with a pair of wheels, an auxiliary wheel journaled between a pair of hangers hinged near one end of said truck, eyebolts secured to said hangers and engaging means secured near the center of said body, said bolts provided with detachable means for securing the same in engagement with said means carried by the body, means carried by the body at each end thereof for receiving a detachable reach and rollers journaled upon said body near the center thereof and extending partly outside of the horizontal plane of the floor portion of said body.

6. A truck comprising a wheeled body portion, swinging hangers secured to said body portion, an auxiliary wheel carried by said hangers and means carried by said body and assembled with said auxiliary wheel for permitting and limiting the swinging action of the same, and means for assembling said truck with a forward truck.

In testimony whereof I have hereunto set my hand in the presence of two subscribing witnesses.

RHINOLD W. GRUNSKE

Witnesses:
 LOUISE STREICH,
 G. STREICH.